United States Patent
Gruber

[19]

[11] Patent Number: 6,092,685
[45] Date of Patent: Jul. 25, 2000

[54] CAPLESS REFUELING ASSEMBLY

[75] Inventor: Herbert Gruber, Rochester Hills, Mich.

[73] Assignee: Tesma International Inc., Concord, Canada

[21] Appl. No.: 09/173,770

[22] Filed: Oct. 16, 1998

Related U.S. Application Data

[60] Provisional application No. 60/062,205, Oct. 16, 1997.

[51] Int. Cl.⁷ .............................. B65D 51/16; F16K 24/00
[52] U.S. Cl. ........................ 220/86.2; 137/588; 220/231; 220/360
[58] Field of Search .............................. 220/202, 203.01, 220/203.04, 203.06, 203.07, 203.23, 203.27, 203.29, 231, 316, 368, 86.1, 86.2, 89.1, 360, 203.19; 137/588; 141/301, 59

[56] References Cited

U.S. PATENT DOCUMENTS

| | | |
|---|---|---|
| 3,186,580 | 6/1965 | Previte ............................... 220/203.07 |
| 4,651,889 | 3/1987 | Uranishi et al. . |
| 4,659,346 | 4/1987 | Uranishi et al. ........................ 137/588 |
| 4,747,508 | 5/1988 | Sherwood . |
| 4,770,677 | 9/1988 | Harris . |
| 4,826,511 | 5/1989 | Harris . |
| 4,883,103 | 11/1989 | Szlaga et al. . |
| 4,953,583 | 9/1990 | Szlaga . |
| 4,977,936 | 12/1990 | Thompson et al. . |
| 5,022,433 | 6/1991 | Jansky et al. . |
| 5,056,570 | 10/1991 | Harris et al. . |
| 5,186,220 | 2/1993 | Scharrer . |
| 5,247,958 | 9/1993 | Deparis et al. . |
| 5,275,145 | 1/1994 | Tuckey . |
| 5,275,213 | 1/1994 | Perkins ................................. 220/86.1 |
| 5,408,977 | 4/1995 | Cotton . |
| 5,514,323 | 5/1996 | Ramioulle . |
| 5,592,963 | 1/1997 | Bucci et al. . |
| 5,660,206 | 8/1997 | Neal et al. . |
| 5,720,328 | 2/1998 | Ott . |
| 5,732,840 | 3/1998 | Foltz . |
| 5,735,424 | 4/1998 | Diederiks, Jr. et al. . |
| 5,791,387 | 8/1998 | Palvolgyi ............................... 220/86.2 |
| 5,845,800 | 12/1998 | Shaw et al. ........................... 220/86.2 |

FOREIGN PATENT DOCUMENTS

| | | |
|---|---|---|
| 0771685 | 5/1997 | European Pat. Off. . |
| 19621031 | 1/1997 | Germany . |
| 19532307 | 3/1997 | Germany . |
| 19542703 | 5/1997 | Germany . |
| WO9721561 | 6/1997 | WIPO . |

*Primary Examiner*—Stephen Castellano
*Assistant Examiner*—Niki M. Eloshway
*Attorney, Agent, or Firm*—Howard & Howard

[57] ABSTRACT

A capless refueling assembly for opening and closing a filler neck of a gas tank. The refueling assembly includes a housing attached to the filler neck. A lid is pivotally mounted to the housing between open and closed positions for facilitating the opening and closing of the filler neck. A valve mechanism is movably mounted to the housing between seated and unseated positions for selectively releasing pressurized fluid from the filler neck. The refueling assembly is characterized by an actuation device automatically moving the valve mechanism from the seated position to the unseated position while the lid remains in the closed position. Accordingly, any pressurized fluid within the filler neck is vented to a safe area, preferably a carbon canister, before the lid is moved to the open position.

18 Claims, 5 Drawing Sheets

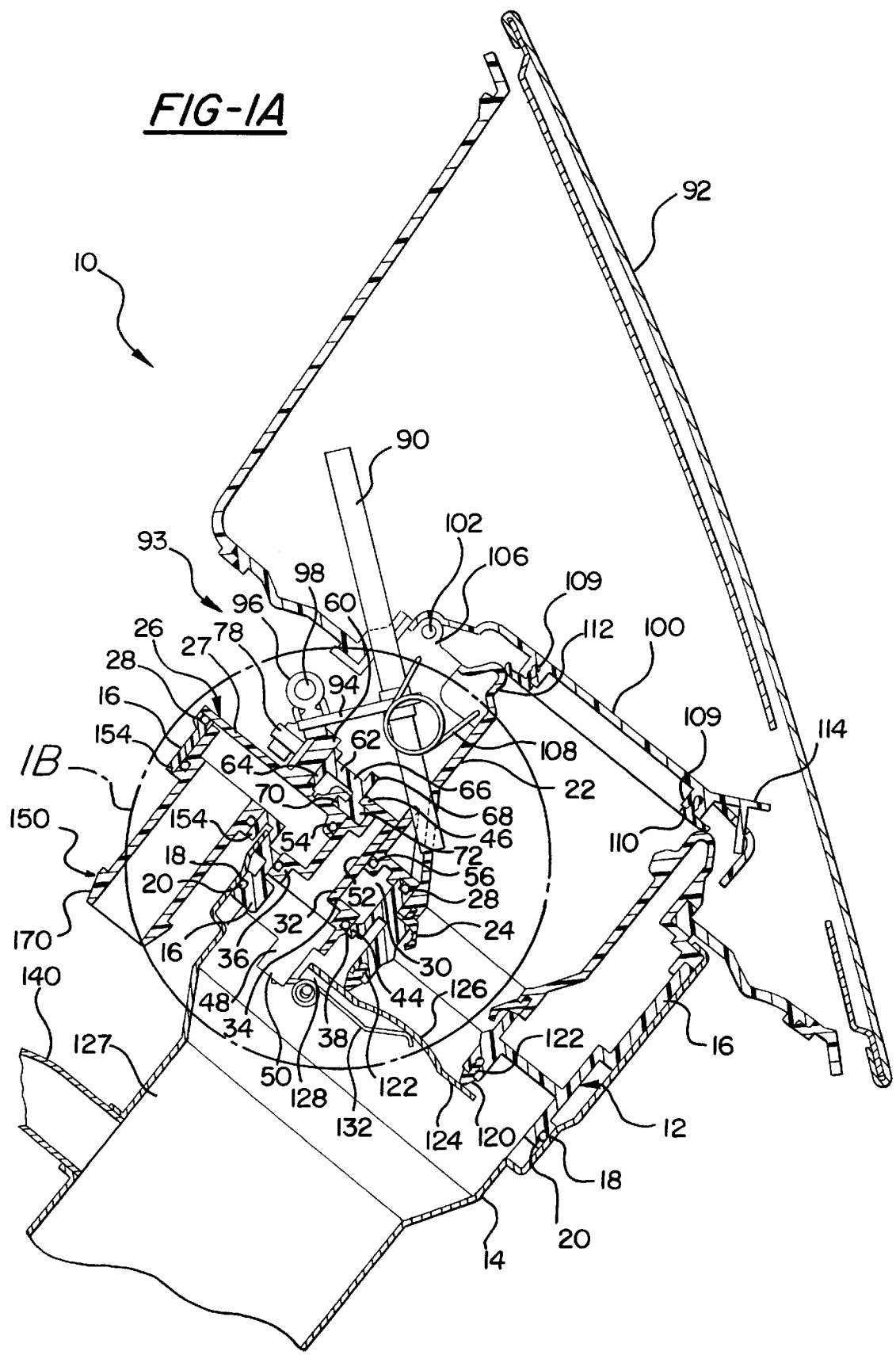

CAPLESS REFUELING ASSEMBLY

RELATED APPLICATION

This patent application claims priority to and all the benefits of U.S. Provisional Patent Application Ser. No. 60/062,205, filed on Oct. 16, 1997 and entitled "Capless Refueling System".

BACKGROUND OF THE INVENTION

1) TECHNICAL FIELD

The subject invention relates to a capless assembly for the refueling of automotive fuel tanks.

2) DESCRIPTION OF THE PRIOR ART

Most vehicle fuel tanks include a filler neck extending from the tank to allow a user to refill the tank with fuel. Some type of cap or cover is placed over the filler neck in order to seal the fuel tank from the atmosphere. The most common type of cover is a gas cap. Conventional gas cap assemblies are typically threaded onto the filler neck and include some type of locking handle. To fill the fuel tank a user must completely remove the gas cap from the filler neck.

The prior art has also contemplated the use of a pivotal cover moveable between open and closed positions to open and close the filler neck. These prior art designs have a pivotal cover mounted within a removable gas cap. An advantage of these designs is that the user does not have to remove the gas cap to fill the fuel tank. One such design also has the cover linked to a outer filler door such that when the filler door is opened the cover automatically opens. Examples of these prior art designs are disclosed in U.S. Pat. Nos. 5,720,328 to Ott and 5,735,424 to Diederiks, Jr. et al. These prior art gas cap assemblies have a number of deficiencies. One primary deficiency is that they do not provide an effective means for releasing pressurized fluid within the filler neck before the cover is opened. Over time, operating pressures and temperatures within the filler neck can approach dangerous levels, which may result in spraying fuel onto the user removing or opening the closure due to the quick pressure release when the cap, or closure, is removed. The dangers associated with opening a pressurized fuel tank can include affixation, burning, scorching, and various environmental hazards. Hence, it is desirable to ensure a gradual pressure decay within the fuel filler neck and fuel tank prior to removing the cap or opening the closure.

SUMMARY OF THE INVENTION AND ADVANTAGES

A capless refueling assembly for selectively opening and closing a filler neck of a gas tank. The assembly comprises a housing for attachment to the filler neck. A lid structure is movably mounted to the housing between open and closed positions for facilitating the opening and closing of the filler neck. A valve mechanism is movably mounted to the housing between seated and unseated positions for selectively releasing pressurized fluid from the filler neck. The assembly is characterized by an actuation device automatically moving the valve mechanism from the seated position to the unseated position while the lid structure remains in the closed position, thereby venting the pressurized fluid from the filler neck before the lid structure is moved to the open position.

Accordingly, the pressurized fluid, i.e., fuel vapors, within the filler neck is discharged to a safe area before the lid structure or cover is opened. Specifically, the fuel vapors in the filler neck are vented upon actuation of the valve mechanism so that vapor pressure within the filler neck is substantially dissipated by the time the lid is opened. The subject invention incorporates the advantages of not having to remove a gas cap while eliminating the dangers involved with the prior art systems. In other words, the present invention provides an automobile refueling assembly which is simple to operate and minimizes operator requirements for improved and safe refueling operations.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1A is a cross-sectional view of the capless refueling assembly mounted to a vehicle with a lid structure in a closed position and a valve mechanism in a seated position;

DETAILED DESCRIPTION OF THE PREFERRED EMBODIMENT

Figure 1B:
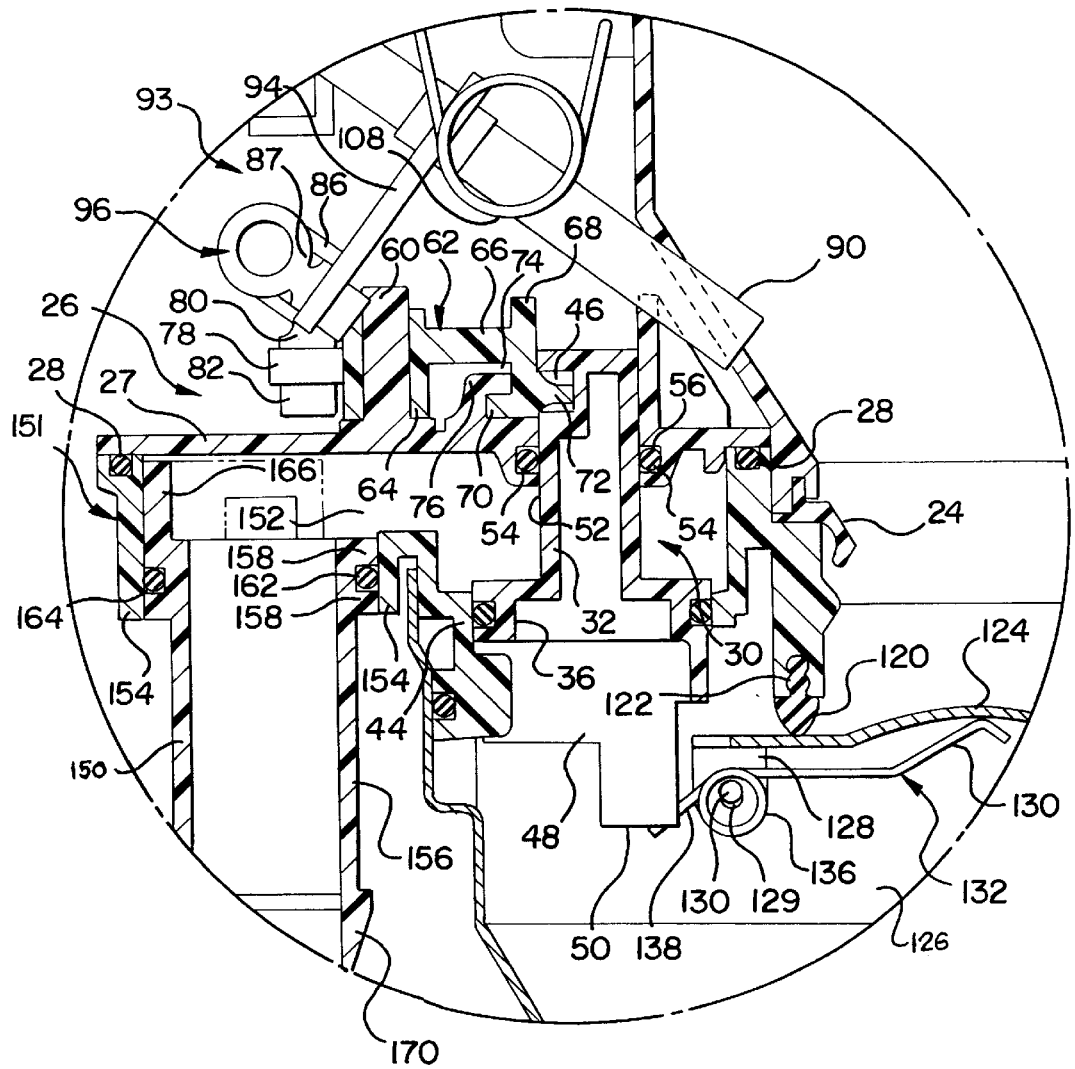
FIG. 1B is an enlarged sectional view of a circled portion 1B of FIG. 1A.

Referring to the Figures, wherein like numerals indicate like or corresponding parts throughout the several views, there is shown in FIG. 1A a cross-sectional view of a capless refueling assembly, generally indicated at 10, in accordance with the present invention. The refueling assembly 10 includes a plastic main housing, generally indicated at 12, mounted in sealed relation at the end of a filler neck 14 which leads to a fuel tank (not shown). The housing 12 includes an outer housing portion 16 which forms a peripheral sealing engagement with an inner surface of the filler neck 14, e.g., by an annular elastic O-ring 18 received within an O-ring groove 20 in the outer periphery of the housing portion 16. The housing 12 further includes a tubular inner housing portion 22 connected with the outer housing portion 16 and constructed and arranged to receive a fuel nozzle N.

The housing 12 also includes a resilient seal structure 24 of an annular configuration and disposed at the radially innermost interface between the outer housing portion 16 and the inner housing portion 22. The seal structure 24 is annular in form and is preferably made from a rubber material. The seal structure 24 defines the radially innermost portion of the housing 12 and is constructed and arranged to form a seal with the fuel nozzle N inserted into the filler pipe. The housing 12 further includes a sealing portion 26 and a valve mechanism 30, which is constructed and arranged to open and close fluid communication between the filler neck 14 and an external carbon canister as will be described later. The sealing portion 26 includes a disk shaped wall portion 27 which forms a sealed connection with the outer housing portion 16, e.g., via O-ring 28.

The refueling assembly 10 further includes a dust lid structure 100 which is movably mounted to the housing 12 between open and closed positions for facilitating the opening and closing of the filler neck 14. The lid structure 100 is discussed in greater detail below.

The valve mechanism 30 is movably mounted to the housing 12 between seated and unseated positions for selectively releasing pressurized fluid from the filler neck 14. The valve mechanism 30 preferably has a hollow configuration, and includes a substantially cylindrical stem portion 32, a radially outwardly extending wall portion 34 at a lower end of the stem portion 32, and a generally annular sealing portion 36 annularly formed with the periphery of the wall portion 34. The valve mechanism 30 comprises an O-ring 38 received in an O-ring groove formed at the outer periphery of sealing portion 36. The sealing portion 36 is constructed and arranged to form an annular seal with an opening defined by an annular or cylindrical wall portion 44 of the outer housing portion 16. The valve mechanism 30 is disposed adjacent the inner housing portion 22.

The stem portion 32 of valve mechanism 30 has a notch or groove 46 formed towards an upper portion thereof. The groove 46 extends only partially around the circumference of the stem portion 32, e.g., approximately ⅓ around, and has a slightly angled or helical configuration.

In addition, the valve mechanism 30 has a lower extension portion 48 which is integrally formed with and extending downwardly from the plastic material forming the sealing portion 36. The lower extension portion 48 has an irregular configuration, which includes a lower surface 50.

The exterior cylindrical surface 52 of the stem portion 32 is disposed in sliding sealed relation with an O-ring 54 disposed in surrounding relation with respect to an opening in the disk shaped wall 27 of sealing portion 26. In particular, the O-ring sealing structure 54 is received within an O-ring groove 56 defined in the plastic material of wall 27 of sealing portion 26.

The refuelling assembly 10 is characterized by an actuation device 93 automatically moving the valve mechanism 30 from the seated position to the unseated position while the lid structure 100 remains in the closed position, thereby venting the pressurized fluid, i.e., fuel vapor, from the filler neck 14 before the lid 100 is moved to the open position. The actuation device 93 includes a valve actuating cam member 62 rotatably mounted to the housing for facilitating movement of the valve mechanism 30.

The sealing portion 26 also has an upwardly extending projection 60 extending upwardly from the generally disc shaped wall portion 27 thereof. The projection 60 serves as a pivot pin or axis for the cam member 62.

As best shown in FIG. 1B, the cam member 62 of the refueling assembly 10 has a main hub portion 64, which is cylindrical in form and which is mounted for rotation about the projection 60. The cam member 62 then has a radially outwardly extending first arm portion 66 which is of a sector configuration and has a substantially plate-like configuration. An arcuate wall portion 68 is integrally formed with the radially outer portion of the first arm portion 66 and also has a sector-configuration, which is disposed in substantially parallel relation with the hub-portion 64 for its entire circumferential extent. The wall portion 68 has a radially inwardly extending ridge 70, which is received in a corresponding groove 74 formed in an upwardly extending projecting portion 76 of the disc-shaped wall portion 27.

The wall portion 68 of the cam member 62 further includes a helical ridge or thread portion 72 projecting radially outwardly from an outer periphery thereof. The thread portion 72, being helical in configuration, is disposed towards the lower end of wall portion 68 at one end thereof and progressively extends upwardly along wall portion 68 as it extends circumferentially along the wall portion 68. The thread portion 72 is received within the groove 46 of the stem portion 32 of the valve mechanism 30 wherein rotation of the cam member 62 rotates the threaded portion 72 to move the valve mechanism 30 between the seated and unseated positions.

Figure 3:
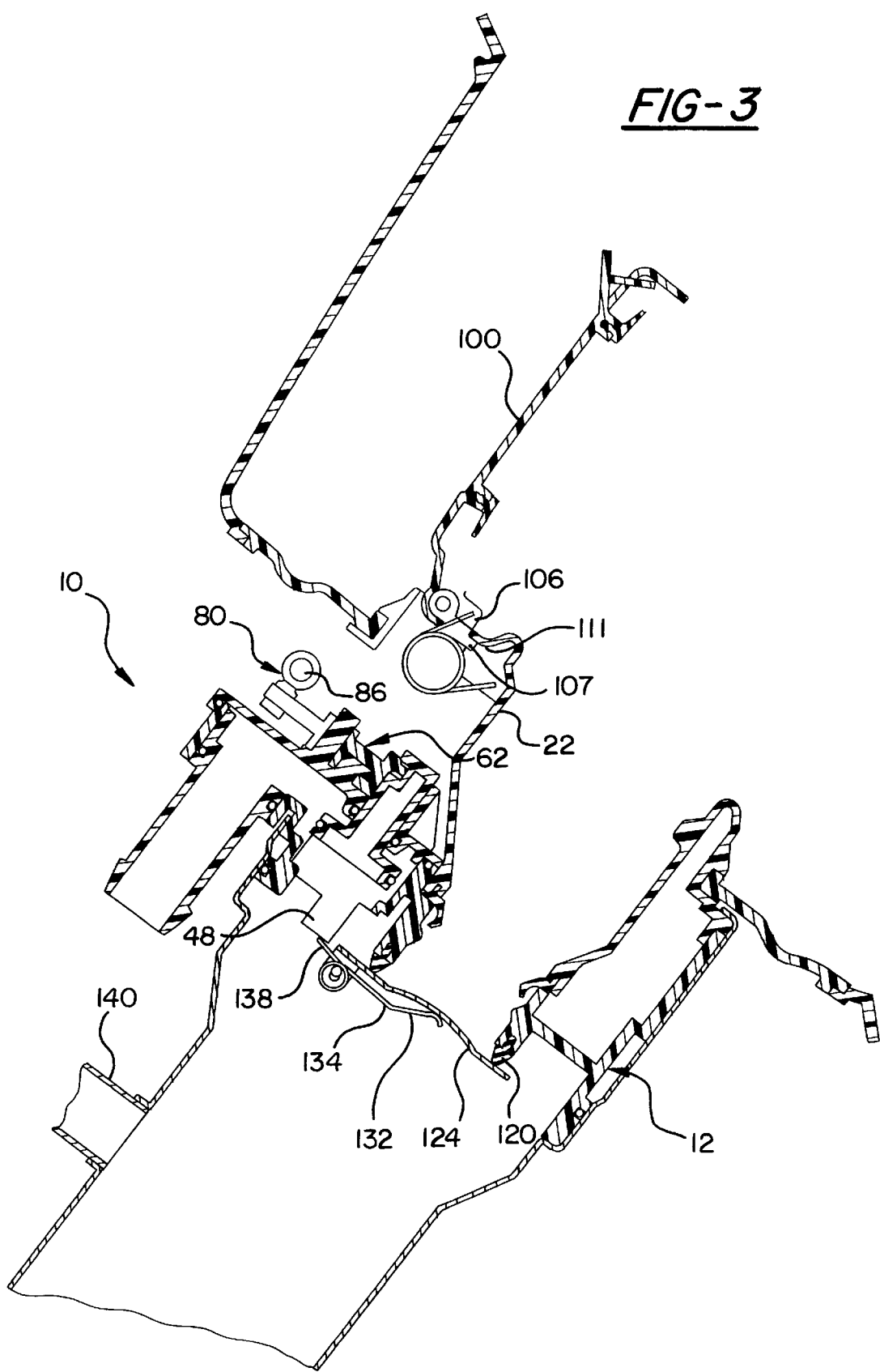
FIG. 3 is a cross-sectional view of the refueling assembly with the lid in a fully open position.

The cam member 62 has a second arm portion 78 extending from the hub portion 64. The second arm portion 78 extends radially outwardly from the hub portion 64 and has substantially plate-like construction. A hole within its plate-like construction is constructed and arranged to receive a linkage member 80, which has a lower cylindrical portion 82 which is received within the hole in the second arm portion 78. A portion of the cylindrical member 82 which extends within the second arm portion 78 has a narrowed-diameter, which serves as an annular groove within which the surrounding portions of the second arm portion 78 is received. This construction enables the linkage member 80 to pivot or swivel about its longitudinal axis extending along the cylindrical portion 82. The upper portion of the linkage member 80 comprises a ball-joint 86, which is constructed and arranged to receive one end of a linkage rod 87. The construction of the linkage member 80 can be more readily appreciated from FIG. 3, wherein certain portions are removed to better reveal this member.

The actuation device 93 further includes an actuation lever 94 having first and second ends. The linkage rod 87 interconnects the cam member 62 and the first end of the actuation lever 94 wherein movement of the actuation lever 94 rotates the cam member 62. Specifically, the second arm portion 78 of the cam member 62 is pivotally mounted to the linkage rod 87 to rotate the cam member 62 and move the valve mechanism 30 in response to movement of the actuation lever 94. A hinge pin 90 is rotatably mounted to the second end of the actuation lever 94 for rotating the actuation lever 94. As appreciated by those skilled in the art, the actuation lever 94 may be actuated by any suitable device in any suitable manner.

Preferably, the hinge pin 90 serves as the hinge pin for a hinge (not shown) for the outer filler door 92. The hinge pin 90 rotates along its longitudinal axis upon opening of the outer filler door 92 and the actuation lever 94 is fixed to an intermediate portion of the hinge pin 90 and extends radially outwardly from the hinge pin 90. The first end of the actuation lever 94 carries a linkage member 96, which is identical in structure to the previously described linkage member 80. It thus can be appreciated that the actuation lever 94 is of a plate-configuration having a hole for receiving a lower cylindrical portion of the linkage member 96 to enable the linkage member 96 to pivot about its longitudinal axis. In addition, the linkage member 96 has a ball-joint 98, which is constructed and arranged to receive the opposite end of the linkage rod 87 which is connected with the linkage member 80.

The linkage rod 87 (substantially hidden and shown in dashed lines in FIG. 1B) which extends between the linkage member 80 and a linkage member 96 cooperates with such linkage members 80, 96 to allow for the required three-dimensional movement of such linkage between the actuation lever 94 and the cam member 62.

It can be appreciated that the hinge pin 90 is received and mounted for rotation within the hinge of the outer filler door 92.

The lid structure 100 is now discussed in greater detail. In particular, a pin member 102 is mounted on the inner housing portion 22 and permits pivotal movement of the lid structure 100. A mounting portion 106 of the lid 100 is connected with a lid spring 108. The lid spring 108 has a first end engaging the housing 12 and a second end engaging the lid 100 for assisting in pivotally moving the lid 100 between the open and closed positions. Preferably, the lid spring 108 is an over center spring. Specifically, the first end of the lid spring 108 is connected with the inner housing portion 22. It will be appreciated from FIGS. 2 and 3 that the initial pivoting movement of the lid 100 operates against the natural bias of the lid spring 108. When the lid 100 is pivoted beyond the over-center position, the force of lid spring 108 will take over and open the lid 100 to its fully opened position.

The lid structure 100 is molded from a plastic material and has an annular seal retaining groove 109 molded along an interior surface thereof. An annular resilient sealing structure 110, preferably made of rubber, is received within the groove 109 and forms an annular seal with an upper annular edge 112 formed by a curved or bent portion of the inner housing portion 22. The sealing structure 110 seals with the edge 112 when the lid 100 is in the closed position.

The lid structure 100 has an angled projecting portion 114 extending upwardly and outwardly from an upper portion thereof for assisting in the pivotal movement of the lid 100 between the open and closed positions.

At the radially inner and lower distal end of the inner housing portion 22 is disposed an annular sealing member 120, preferably made from rubber. The annular sealing member 120 is fixedly mounted within a lower groove 122 in the inner housing portion 22.

The refueling assembly 10 further includes a flap seal 124, preferably made from a stamping of sheet metal, preferably aluminum. The flap seal 124 is pivotally mounted to the housing 12 and selectively engageable with the annular sealing member 120. Specifically, the flap seal 124 has an upper surface 126 which is constructed and arranged to be disposed in annular sealing contact with the annular sealing member 120 so as to seal the fuel vapors in an upper region 127 of the filler neck 14. As appreciated, the flap seal 124 works in conjunction with the lid structure 100 to seal the filler neck 14 from the atmosphere.

As best see in FIG. 1B, flap seal 124 has a hinge portion 128 stamped therein. The hinge portion 128 has a central opening 129 constructed and arranged to receive a pivot pin 130. The pivot pin 130 is fixed at opposite ends thereof to opposing portions of the outer housing portion 16 (not shown in FIGS. 1–4). The flap seal 124 functions in conjunction with a torsional spring structure 132 to provide a biased sealing assembly.

The spring structure 132 has an elongated leg extension 134, a coiled portion 136, and a truncated leg portion 138. The leg extension 134 constitutes one end portion of the torsional spring structure 132, while the truncated leg portion 138 constitutes an opposite end portion of the spring material forming the torsional spring structure 132. The coiled portion 136 forms an intermediate portion of the spring material forming the torsional spring structure 132. The coiled portion 136 is coiled around the pivot pin 130 to mount the spring structure 132 in place.

The elongated leg extension 134 of the spring structure 132 provides an upwardly biased force to the underside of the flap seal 124 to maintain a firm seal with the resilient annular sealing member 120. The opposite truncated leg portion 138 of the spring structure 132 provides an upwardly biasing force upon the lower extension portion 48 of the valve mechanism 30. Specifically, the lower surface 50 of the lower extension portion 48 selectively engages the truncated leg portion 138 of the spring structure 132 to increase or decrease the biasing force of the spring structure 132. The upwardly biasing force applied by the truncated leg portion 138 is significantly greater in its configuration in FIG. 1, wherein the valve mechanism 30 is in its lower, seated position, as opposed to the configuration in FIG. 2, wherein the valve mechanism 30 is in an upper, unseated position. The relieving of the spring tension in the truncated leg portion 138 during movement of the valve mechanism 30 from its seated position to its unseated position causes the elongated leg extension 134 to provide less of an upwardly biased force to the flap seal 124. This relief of upward biasing force in the elongated leg extension 134 facilitates easier movement of the fuel nozzle N through the flap seal 124.

As can be appreciated from FIGS. 1–4, the refueling assembly 10 further includes a venting pipe 140 which is connected at one end toward the upper portion of filler neck 14 and at the opposite end connected to an upper portion of the fuel tank. Preferably the venting pipe 140 is at a position on the fuel tank which is exposed only to fuel vapors and not fuel liquid. The venting pipe 140 provides a venting passage for fuel vapors in the fuel tank to pass into the upper region 127 of the filler neck 14, especially in instances in which the lower end of the filler neck 14 is submerged in liquid fuel or during the filling process.

The refueling assembly 10 further includes a hose connector structure 150 which is connected with the housing 12. In particular, the outer portion 16 of the main housing 12 has a projecting portion 151 which projects radially outwardly beyond the circumference defined by the upper region 127 of filler neck 14. This projecting portion of the outer housing portion 16 cooperates with the sealing portion 26 to define a space 152 disposed above the sealing portion 36 of the valve mechanism 30 to which fuel vapors are vented. The space 152 provides a fluid passageway between the filler neck 14 and the connector structure 150 when the valve mechanism 30 is in the unseated position whereby the pressurized fluid vapors may be released from the filler neck 14. The outer portion 16 has a cylindrical wall portion 154 which forms part of the projecting portion 151 and defines an area within which connector structure 150 can be sealingly disposed.

In particular, the connector structure 150 has a main cylindrical body portion 156. The upper portion of the cylindrical main body 156 is provided with two annular ridges 158 projecting radially outwardly to define a groove 162 therebetween. The groove 162 serves to seat an O-ring 164. The connector structure 150 has an upper wall portion 166, being substantially cylindrical in configuration, but having a discontinuity or opening in its circumferential extent so as to establish communication between the cylindrical body portion 156 and the space 152.

The connector structure 150 has a lower end 170, which is constructed and arranged to sealingly receive a flexible hose around its periphery (not shown). The hose leads to a conventional carbon canister for filtering and/or temporarily storing fuel vapors.

During operation, the refueling assembly 10 is initially in a closed position as shown in FIG. 1A. To commence a refueling operation, the outer filler door 92 is opened either by manually engaging and pivoting the door 92 about the hinge pin 90, or by effecting opening of the door 92 by a remote mechanism. As the door 92 is opened, the hinge pin 90 is rotated about its longitudinal axis, causing rotational movement of the actuation lever 94 connected with the hinge pin 90. The direction of the aforementioned movement of the actuation lever 94 is into the page in the views shown in FIGS. 1–4. This movement of the actuation lever 94 causes movement of linkage member 96 and linkage member 80 via the linkage rod 87 which establishes a three-dimensional connection between such linkage members. The movement of linkage member 80 effects rotational movement of the cam member 62 about the axis defined by the projection 60. The rotation of cam member 62 causes the threaded portion 72 thereof to rotate, thus causing a corresponding upward movement of groove 46 and the entire valve mechanism 30. As a result, the sealing portion 36 of the valve mechanism 30 is unseated from the annular wall portion 44 to establish communication between the vapor in upper region 127 and the carbon canister via the space 152, as can be appreciated from FIG. 2. This communication is established while the vapors in upper region 127 remain sealed from atmosphere.

As a result of the valve mechanism 30 being moved to its upper, unseated position, the lower extension portion 48 reduces the amount of stress that is seen by truncated leg portion 138 of the spring structure 132. The valve mechanism 30 is shown in the upper, unseated position in FIG. 2.

It can also be appreciated that because the valve mechanism 30 is opened upon opening of the outer filler door 92, any pressure build-up in the fuel tank or filler neck 14 is adequately vented through connector structure 150 (and into a carbon canister) before the lid structure 100 is opened and well before the flap seal 124 is opened. As a result, adequate dissipation of pressure from the tank/filler neck is achieved when the flap seal 124 is opened without requiring the user to take any additional measures and then waiting for pressure to dissipate.

Figure 2:
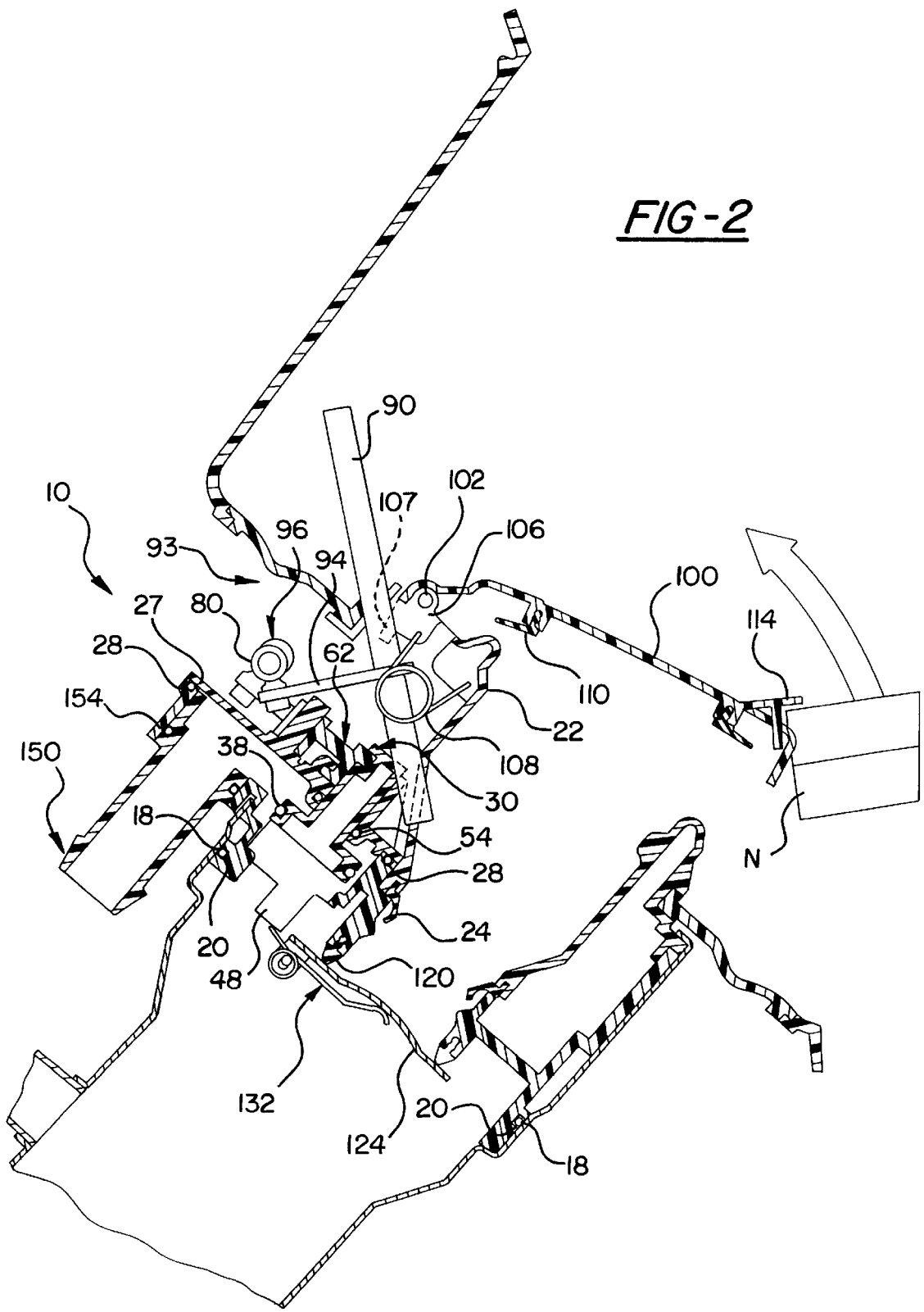
FIG. 2 is a cross-sectional view of the refueling assembly with the lid in a partially open position and the valve mechanism in an unseated position.

The next step in the refueling operation, as also shown in FIG. 2, is pivoting the lid structure 100 about the hinge pin 102. This may be accomplished by manually engaging and moving the lid 100 about the hinge pin 102 or by utilizing the front end of the nozzle N to engage the projection 114 and pivot the lid 100 around the hinge pin 102. During this movement of the lid 100, the lid spring 108 eventually reaches its over-center position and assumes the lifting or opening action of the lid 100 and moves the lid 100 into its fully opened position. The fully opened position is determined by a stop member 107 of a mounting portion 106 as can be appreciated from FIG. 3. In particular, the stop portion 107 will engage an abutting surface or lip 111 of inner housing portion 22 as shown to prevent further rotation of the lid 100.

Figure 4:
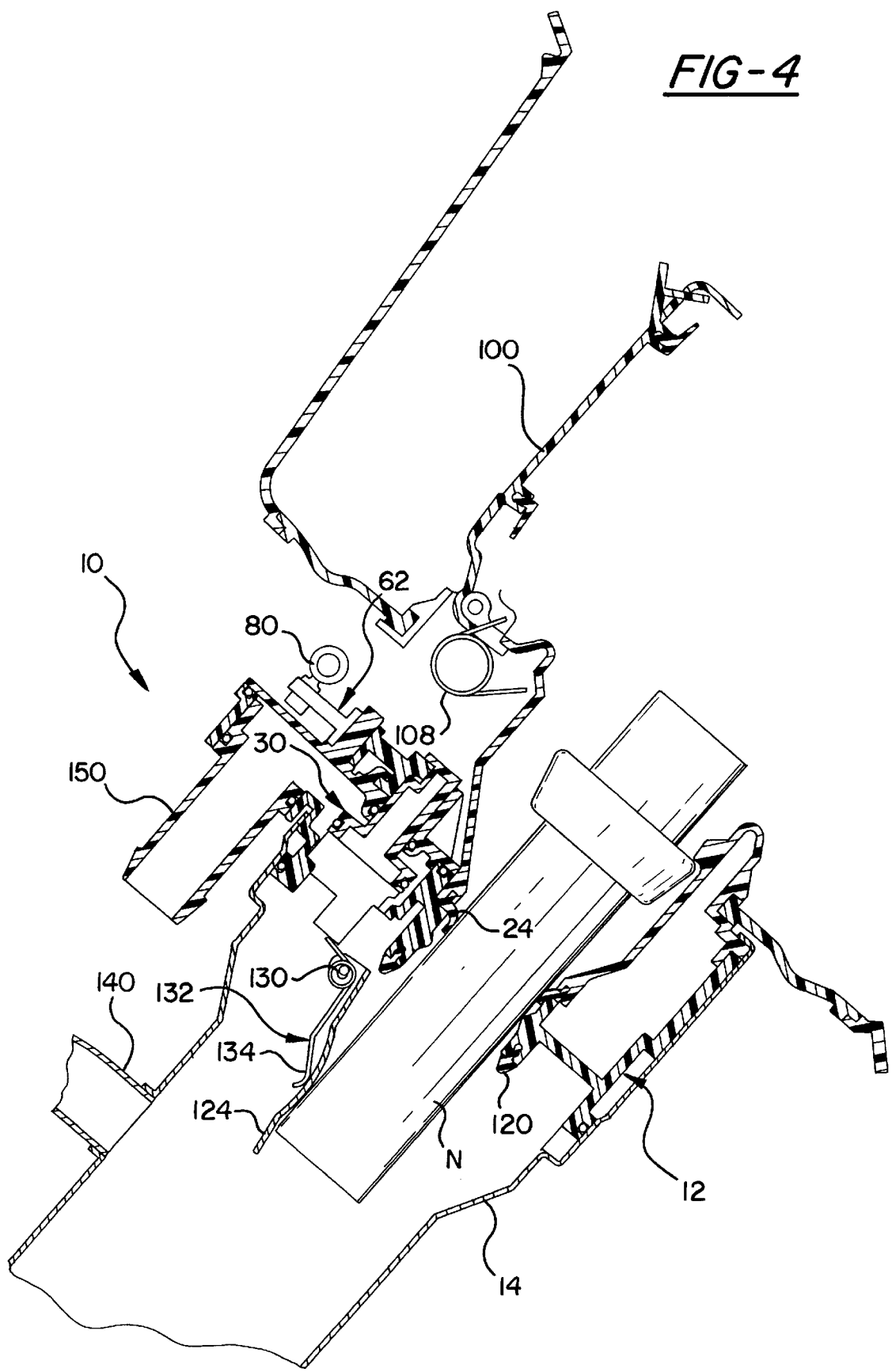
FIG. 4 is a cross-sectional view of the refueling assembly with a nozzle inserted into a filler neck.

As shown in FIG. 4, the fuel nozzle N can be inserted through the housing 12 to engage flap seal 124 with its forward end. Continued movement of the fuel nozzle N causes the flap seal 124 to pivot about the pin 130 and against the bias of spring structure 132. The upward biasing force of leg extension 134 of spring structure 132 has been somewhat relieved by movement of the valve structure 30 into its upper position, pivotal movement of the flap seal 124 is accomplished with less force than what would otherwise be required if the flap seal 124 were to be opened without relieving this spring tension. The spring tension is maintained at a greater level when the valve mechanism 30 is seated, to enhance the seal from atmosphere during non-fulfilling conditions.

After the fuel nozzle N is triggered during a fueling operation, fuel vapor is forced back up from the fuel tank toward the top of the filler neck 14 through the venting pipe 140 and/or through the filler neck 14 itself. The fuel vapor then permeates through the space 152, through the connector structure 150 and then through the carbon canister connected to the connector structure 150.

During the refilling process, the seal structure 24 forms a peripheral seal around the fuel nozzle N to provide a barrier between the vapor within the upper region 127 and the atmosphere.

When refueling is completed, the nozzle N is withdrawn and the flap seal 124 returns to its sealing relation with respect to the annular sealing member 120 under the force of spring structure 132. The lid 100 is then closed, again with the lid spring 108 taking over the movement of the lid 100 towards the closed position after the lid 100 is moved passed the over-center position toward the closed position. The outer filler door 92 is then pivoted about the longitudinal axis of hinge pin 90. This pivotal movement of the outer filler door 92 causes rotational movement of the hinge pin 90 about its own longitudinal axis, which in turn causes movement of the linkage members 80, 96, and resultant rotational movement of the cam member 62 about the longitudinal axis of the projection 60. The threaded portion 72 of the cam member 62 forces the valve mechanism 30 downwardly into its seated position as shown in FIG. 1A and 1B. The downward movement of the valve mechanism 30 causes the lower extension portion 48 to provide additional stress to truncated leg portion 138 of spring structure 132, so that the leg extension 134 provides an increased upwardly biasing force to the flap seal 124 against the annular sealing member 120 to maintain integrity of the seal from the atmosphere.

In an alternate embodiment (not shown), an inwardly extending projection from the outer filler door 92 may come into contact with the upper or outer surface of the lid 100. In this arrangement, if the operator forgets to close the lid 100, movement of the outer filler door 92 to its closed position will cause the projection to engage the lid 100 and move the lid 100 toward its closed position, beyond the over-center position, so that the lid 100 will close automatically when the outer filler door 92 is closed, in the event that an individual operator forgets to close the lid structure 100 directly.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A capless refueling assembly for selectively opening and closing a filler neck of a fuel tank, said assembly comprising:

a housing for attachment to the filler neck;

an outer filler door pivotally mounted between open and closed positions for facilitating access to said filler neck;

a lid structure movably mounted to said housing between open and closed positions for facilitating the opening and closing of the filler neck;

a valve mechanism movably mounted to said housing between seated and unseated positions for selectively releasing pressurized fluid from the filler neck;

an actuation device operably connected between said outer filler door and said valve mechanism said actuation device including a cam member rotatably mounted to said housing and threadably engaging said valve mechanism; said cam member coupled to said outer filler door to transfer movement thereof into rotation of said cam member effecting said movement of said valve mechanism, whereby as said outer filler door moves from the closed position to the open position, said valve mechanism automatically moves from said seated position to said unseated position while said lid structure remains in said closed position, thereby venting the pressurized fluid from the filler neck before said lid structure is moved to said open position.

2. An assembly as set forth in claim 1 wherein said actuation device further includes an actuation lever having first and second ends.

3. An assembly as set forth in claim 2 further including a linkage rod interconnecting said cam member and said first end of said actuation lever wherein movement of said actuation lever rotates said cam member.

4. An assembly as set forth in claim 3 further including a hinge pin rotatably mounted to said second end of said actuation lever for rotating said actuation lever.

5. An assembly as set forth in claim 4 wherein said cam member includes a main hub portion with a first arm portion and a second arm portion extending outwardly therefrom.

6. An assembly as set forth in claim 5 wherein said second arm portion of said cam member is pivotally mounted to said linkage rod to rotate said cam member and move said valve mechanism in response to movement of said actuation lever.

7. An assembly as set forth in claim 6 further including a threaded portion mounted to said first arm portion of said cam member for engagement with said valve mechanism wherein rotation of said cam member rotates said threaded portion to move said valve mechanism between said seated and unseated positions.

8. An assembly as set forth in claim 7 wherein said valve mechanism includes a stem portion having a groove for engagement with said threaded portion of said first arm portion and a sealing portion for selective sealing engagement with said housing between said seated and unseated positions.

9. An assembly as set forth in claim 8 wherein said housing defines a space disposed above said sealing portion of said valve mechanism, said space provides a fluid passageway between the filler neck and a connector structure when said valve mechanism is in said unseated position whereby the pressurized fluid may be released from the filler neck.

10. An assembly as set forth in claim 1 wherein said housing includes an inner housing portion adjacent said valve mechanism for receiving a fuel nozzle during a filling process.

11. An assembly as set forth in claim 10 wherein said inner housing portion further includes a resilient seal structure for sealing engagement with the nozzle.

12. An assembly as set forth in claim 10 further including an annular sealing member disposed at a lower distal end of said inner housing portion.

13. An assembly as set forth in claim 12 further including a flap seal pivotally mounted to said housing and selectively engageable with said annular sealing member of said inner housing portion to selectively seal the filler neck.

14. An assembly as set forth in claim 13 further including a spring structure having a leg extension and a truncated leg portion with said leg extension continuously biasing said flap seal toward said annular sealing member.

15. An assembly as set forth in claim 14 wherein said valve mechanism further includes a lower extension portion having a lower surface selectively engaging said truncated leg portion of said spring structure to increase or decrease the biasing force of the spring structure.

16. An assembly as set forth in claim 10 further including a lid spring having a first end engaging said housing and a second end engaging said lid structure for assisting in pivotally moving said lid structure between said open and closed positions.

17. An assembly as set forth in claim 16 wherein said lid structure includes a sealing structure and said inner housing portion includes an annular edge whereby said sealing structure seals with said edge when said lid structure is in said closed position.

18. An assembly as set forth in claim 17 wherein said lid structure further includes a projecting portion for assisting in said pivotal movement of said lid structure between said open and closed positions.

\* \* \* \* \*